US 6,674,769 B1

(12) United States Patent
Viswanath (10) Patent No.: US 6,674,769 B1
(45) Date of Patent: Jan. 6, 2004

(54) SIMULTANEOUS SEARCHING OF LAYER 3 POLICY FILTER AND POLICY CACHE IN A NETWORK SWITCH PORT

(75) Inventor: Somnath Viswanath, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/520,618

(22) Filed: Mar. 7, 2000

(51) Int. Cl.[7] ............................................... H04L 12/56
(52) U.S. Cl. ...................................................... 370/469
(58) Field of Search ................................. 370/389, 392, 370/395.3, 395.31, 395.32, 395.5, 400, 366, 469, 471

(56) References Cited

U.S. PATENT DOCUMENTS

| | | | | |
|---|---|---|---|---|
| 5,920,705 A | * | 7/1999 | Lyon et al. .................. 709/240 |
| 5,938,736 A | * | 8/1999 | Muller et al. ................ 709/243 |
| 5,953,335 A | | 9/1999 | Erimli et al. |
| 6,088,356 A | * | 7/2000 | Hendel et al. ............... 370/392 |
| 6,104,700 A | * | 8/2000 | Haddock et al. ............ 370/235 |
| 6,115,378 A | * | 9/2000 | Hendel et al. ............... 370/392 |
| 6,115,385 A | * | 9/2000 | Vig ............................. 370/401 |
| 6,167,445 A | * | 12/2000 | Gai et al. .................... 709/223 |
| 6,262,988 B1 | * | 7/2001 | Vig ............................. 370/401 |
| 6,424,659 B2 | * | 7/2002 | Viswanadham et al. .... 370/469 |
| 6,512,772 B1 | * | 1/2003 | Karaki et al. ............. 370/395.5 |
| 6,574,240 B1 | * | 6/2003 | Tzeng ........................ 370/469 |
| 2001/0043614 A1 | * | 11/2001 | Viswanadham et al. .... 370/469 |
| 2002/0186705 A1 | * | 12/2002 | Kadambi et al. ........... 370/466 |

* cited by examiner

*Primary Examiner*—Chi Pham
*Assistant Examiner*—Anh Vu Ly
(74) *Attorney, Agent, or Firm*—Manelli Denison & Selter PLLC; Leon R. Turkevich (57) ABSTRACT

A network switch, configured for performing layer 2 and layer 3 switching in an Ethernet (IEEE 802.3) network without blocking of incoming data packets, includes network switch ports, each including a policy filter configured for obtaining layer 3 and layer 4 information from a received layer 2 frame. The layer 3 information and the layer 4 information are used to determine a policy identifier that specifies a layer 3 switching operation to be performed on the received layer 2 frame. Each network switch port also includes a policy cache that caches portions of the layer 3 information and the corresponding policy identifier. The policy filter and the policy cache are then simultaneously searched for subsequent layer 3 frames to find the appropriate policy; if the appropriate policy is located in the policy cache, the searching operation is completed, enabling the network switch port resources to begin searching operations for another packet. Hence, policy search performance can be improved by execution of simultaneous search operations in the policy filter and the policy cache.

15 Claims, 5 Drawing Sheets

SIMULTANEOUS SEARCHING OF LAYER 3 POLICY FILTER AND POLICY CACHE IN A NETWORK SWITCH PORT

BACKGROUND OF THE INVENTION

1. Field of the Invention

The present invention relates to layer 2 and layer 3 switching of data packets in a nonblocking network switch configured for switching data packets between subnetworks.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1q protocol that specifies another subnetwork (via a router) or a prescribed group of stations. Since the switching occurs at the layer 2 level, a router is typically necessary to transfer the data packet between subnetworks.

Efforts to enhance the switching performance of a network switch to include layer 3 (e.g., Internet protocol) processing may suffer serious drawbacks, as current layer 2 switches preferably are configured for operating in a nonblocking mode, where data packets can be output from the switch at the same rate that the data packets are received. Newer designs are needed to ensure that higher speed switches can provide both layer 2 switching and layer 3 switching capabilities for faster speed networks such as 100 Mbps or gigabit networks.

However, such design requirements risk loss of the nonblocking features of the network switch, as it becomes increasingly difficult for the switching fabric of a network switch to be able to perform layer 3 processing at the wire rates (i.e., the network data rate). For example, switching fabrics in layer 2 switches merely need to determine an output port for an incoming layer 2 data packet. Layer 3 processing, however, requires implementation of user-defined policies that specify what type of data traffic may be given priority accesses at prescribed intervals; for example, one user defined policy may limit Internet browsing by employees during work hours, and another user-defined policy may assign a high priority to e-mail messages from corporate executives. In addition, user-defined policies typically involve a large number of combinations of data fields and values that identifying each policy. Hence, policy searches for a given data packet may take a relatively long time, affecting the nonblocking features or latency of the network switch.

SUMMARY OF THE INVENTION

There is a need for an arrangement that enables a network switch to provide layer 2 switching and layer 3 switching capabilities for 100 Mbps and gigabit links without blocking of the data packets.

There is also a need for an arrangement that enables a network switch to provide layer 2 switching and layer 3 switching capabilities with minimal buffering within the network switch that may otherwise affect latency of switched data packets.

There is also a need for an arrangement that enables a network switch to perform layer 3 processing of user-defined policies at the network wire rate on layer 2 data packets while optimizing the use of network switch resources.

These and other needs are attained by the present invention, where a network switch includes network switch ports, each including a policy filter configured for obtaining layer 3 and layer 4 information from a received layer 2 frame. The layer 3 information and the layer 4 information are used to determine a policy identifier that specifies a layer 3 switching operation to be performed on the received layer 2 frame. Each network switch port also includes a policy cache that caches portions of the layer 3 information and the corresponding policy identifier. The policy filter and the policy cache are then simultaneously searched for subsequent layer 3 frames to find the appropriate policy; if the appropriate policy is located in the policy cache, the searching operation is completed, enabling the network switch port resources to begin searching operations for another packet. Hence, policy search performance can be improved by execution of simultaneous search operations in the policy filter and the policy cache.

One aspect of the present invention provides a method in a network switch. The method includes receiving a first layer 2 frame at a network switch port, the first layer 2 frame including layer 3 information and layer 4 information that specify payload data characteristics within the first layer 2 frame. The method also includes determining by a policy filter in the network switch port a policy identifier for the first layer 2 frame based on the layer 3 information and the layer 4 information, the policy identifier specifying a layer 3 switching operation to be performed on the first layer 2 frame. First information, identifying the first layer 3 information and the layer 4 information, and the policy identifier are stored in a policy cache in the network switch port. A second layer 2 frame is received at the network switch port, and a simultaneous search is performed for a second policy identifier for the second layer 2 frame by the policy filter and within the policy cache. The storage of the first information and the corresponding policy identifier in a policy cache within the network switch port increases the search efficiency for the policy identifier on a received data frame, since the searching operation is performed locally without the necessity of accessing remote tables. Moreover, the simultaneous searching by the policy filter and within the policy cache optimizes the searching operation, since cached policy identifiers can be quickly located, enabling the policy filter to a port the existing search and begin a new searching operation; if a policy identifier is not located within the policy cache (or has been removed by an aging function), the policy filter can determine the policy identifier for the received data frame and update the policy cache accordingly.

Another aspect of the present invention provides an integrated network switch configured for executing layer 3 switching decisions. The integrated network switch includes an index table that includes addresses of layer 3 switching entries that specify respective layer 3 switching operations based on selected data fields within a received data packet, the index table also including for each address entry a corresponding entry signature representing a combination of the selected data fields hashed according to a prescribed hashing operation. The integrated network switch also includes network switch ports, each comprising a policy filter and a policy cache. The policy filter is configured for obtaining layer 3 information and layer 4 information, corresponding to the selected data fields, from a received layer 2 frame and determining, based on generation of a second entry signature from the obtained layer 3 information and layer 4 information, a policy identifier that specifies the layer 3 switching operation to be performed on the corresponding layer 2 frame. The policy cache is configured for storing the policy identifier having been determined by the policy filter and the corresponding entry signature, the network switch port simultaneously searching using the policy filter and the policy cache for determining the policy identifier for each corresponding subsequently received layer 2 frame.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

Figure 1:
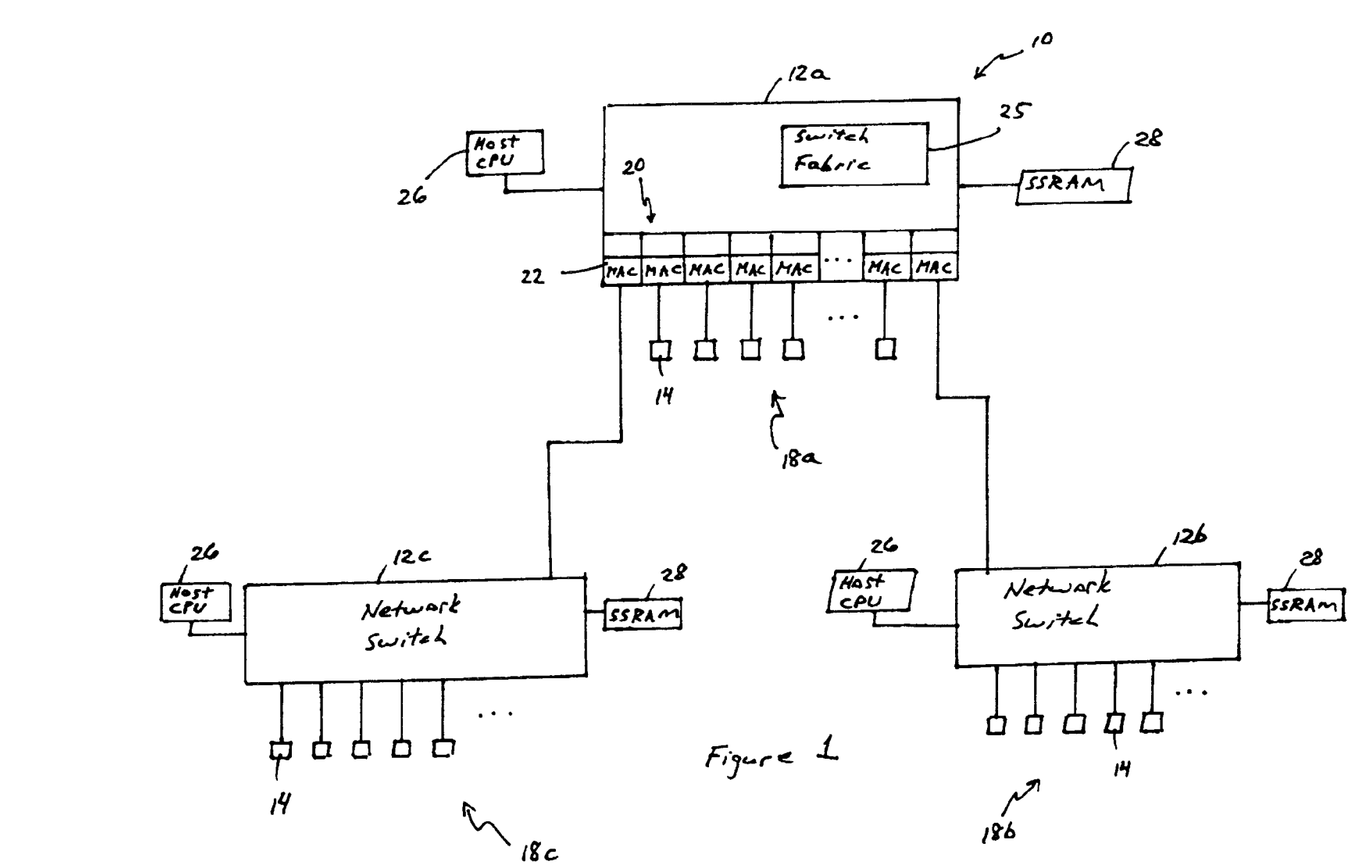
FIG. 1 is a block diagram of a packet switched network including multiple network switches for switching data packets between respective subnetworks according to an embodiment of the present invention.

FIG. 1 is a block diagram illustrating a packet switched network 10, such as an Ethernet (IEEE 802.3) network. The packet switched network includes integrated (i.e., single chip) multiport switches 12 that enable communication of data packets between network stations 14. Each network station 14, for example a client workstation, is typically configured for sending and receiving data packets at 10 Mbps or 100 Mbps according to IEEE 802.3 protocol. Each of the integrated multiport switches 12 are interconnected by gigabit Ethernet links 16, enabling transfer of data packets between subnetworks 18a, 18b, and 18c. Hence, each subnetwork includes a switch 12, and an associated group of network stations 14.

Each switch 12 includes a switch port 20 that includes a media access control (MAC) module 22 that transmits and receives data packets to the associated network stations 14 across 10/100 Mbps physical layer (PHY) transceivers (not shown) according to IEEE 802.3u protocol. Each switch 12 also includes a switch fabric 25 configured for making frame forwarding decisions for received data packets 110, illustrated in FIG. 5. In particular, the switch fabric 25 is configured for layer 2 switching decisions based on source address 118, destination address 120, and VLAN information 132 within the Ethernet (IEEE 802.3) header 112; the switch fabric 25 is also configured for selective layer 3 switching decisions based on evaluation of an IP data packet within the Ethernet packet 110.

As shown in FIG. 1, each switch 12 has an associated host CPU 26 and a buffer memory 28, for example an SSRAM. The host CPU 26 controls the overall operations of the corresponding switch 12, including programming of the switch fabric 25. The buffer memory 28 is used by the corresponding switch 12 to store data frames while the switch fabric 25 is processing forwarding decisions for the received data packets.

As described above, the switch fabric 25 is configured for performing layer 2 switching decisions and layer 3 switching decisions. The availability of layer 3 switching decisions may be particularly effective if an end station 14 within subnetwork 18a wishes to send an e-mail message to selected network stations in subnetwork 18b, 18c, or both; if only layer 2 switching decisions were available, then the switch fabric 25 of switch 12a would send the e-mail message to switches 12b and 12c without specific destination address information, causing switches 12b and 12c to flood all their ports. Otherwise, the switch fabric 25 of switch 12a would need to send the e-mail message to a router (not shown), which would introduce additional delay. Use of layer 3 switching decisions by the switch fabric 25 enables the switch fabric 25 to make intelligent decisions as far as how to handle a packet, including advanced forwarding decisions, and whether a packet should be considered a high-priority packet for latency-sensitive applications, such as video or voice. Use of layer 3 switching decisions by the switch fabric 25 also enables the host CPU 26 of switch 12a to remotely program another switch, for example switch 12b, by sending a message having an IP address corresponding to the IP address of the switch 12b; the switch 12b, in response to detecting a message addressed to the switch 12b, can forward the message to the corresponding host CPU 26 for programming of the switch 12b.

According to the disclosed embodiment, each switch port 20 of FIG. 1 is configured for performing layer 3 processing that identifies for the switching fabric 25 a selected layer 3 switching entry, enabling the switching fabric 25 in response to execute the appropriate layer 3 switching decision corresponding to the identified layer 3 switching entry. Specifically, users of the host processor 26 will specify policies that define how data packets having certain IP protocols should be handled by the switch fabric 25. These policies are implemented by loading into the switch fabric a set of layer 3 switching decisions for each corresponding layer 3 switching entry; in other words, each layer 3 switching entry has a corresponding unique set of layer 3 and possibly layer 4 address values, for example specific values for a IP source address, an IP destination address, a transmission control protocol (TCP) source port, a TCP destination port, a user datagram protocol (UDP) source port, a UDP destination port, and/or a protocol number. Given these address fields within the layer 3 and layer 4 headers, a set of layer 3 switching decisions can be established for each set of unique address fields.

Figure 5:
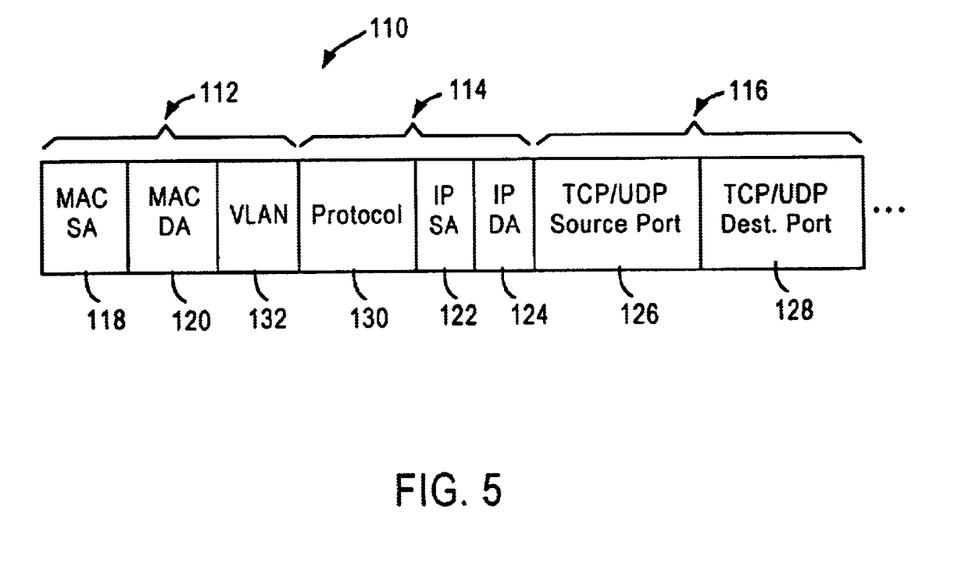
FIG. 5 is a diagram illustrating a layer 2 packet having layer 3 and layer 4 information.

The network switch port 20 is configured for generating a multi-key packet signature to be used as a search key for searching of a layer 3 switching entry for the received data packet. Specifically, the network switch port 20 generates multiple hash keys based on selected parameters in every packet 110, namely IP source address 122, IP destination address 124, TCP/UDP source port 126, TCP/UDP destination port 128, and protocol number 130. These hash keys are combined to form the packet signature, which is then compared by the network switch port 20 with precomputed entry signatures to determine possible matches. The layer 3 switching entries are stored in addresses that are a function of the corresponding entry signature; hence the network switch port 20 can identify the selected layer 3 switching entry that should be used for layer 3 switching decisions based on a match between the corresponding entry signature and the packet signature. The network switch port 20 can then forward the identification of the selected layer 3 switching entry to the switch fabric 25 for execution of the corresponding layer 3 switching decision.

Figure 2:
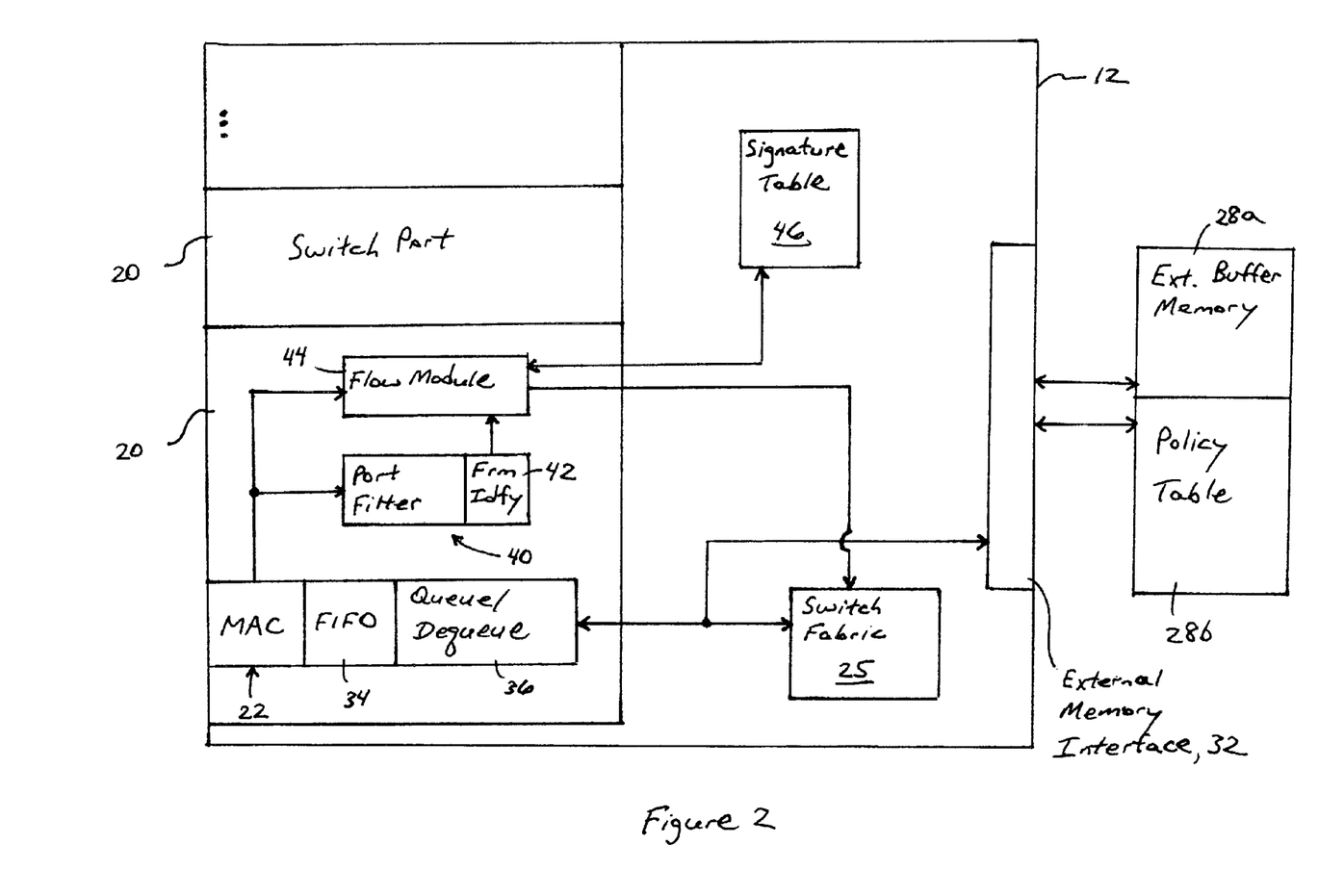
FIG. 2 is a block diagram illustrating in detail the network switch of FIG. 1 according to an embodiment of the present invention.

FIG. 2 is a block diagram illustrating the network switch 12 according to an embodiment of the present invention. The network switch includes a plurality of network switch ports 20, a switch fabric 25, also referred to as an internal rules checker (IRC), that performs the layer 2 and layer 3 switching decisions, and an external memory interface 32 configured for providing access to layer 3 switching entries stored within the external memory 28. In particular, the external memory 28 includes an external buffer memory 28a for storing the frame data, and a policy table 28b configured for storing the layer 3 switching entries at the prescribed addresses, described below. Although shown as a single memory 28, the external buffer memory 28a and the policy table 28b may be implemented as separate, discrete memory devices having their own corresponding memory interface 32 in order to optimize memory bandwidth.

The network switch port 20 includes a MAC portion 22 that includes a transmit/receive FIFO buffer 34 and queuing and dequeuing logic 36 for transferring layer 2 frame data to and from the external buffer memory 28a, respectively.

The network switch port 20 also includes a port filter 40 that includes a frame identifier. The port filter 40 is configured for performing various layer 3 processing, for example identifying whether the incoming data packet includes a layer 3 IP datagram. The frame identifier 42 is configured for identifying the beginning of the IP frame, and locating the layer 3 address entries as the IP frame is received from the network. In particular, the frame identifier identifies the start position of the IP source address, IP destination address, TCP/UDP source port, and TCP/UDP destination port as the data is being received. The network switch port 20 also includes a flow module 44 configured for generating a packet signature using at least two (preferably all four) layer 3 address entries as their start position is identified by the frame identifier 42. In particular, the flow module 44 monitors the incoming data stream, and obtains the IP source address, IP destination address, TCP/UDP source port, TCP/UDP destination port and protocol number in response to start position signals output by the frame identifier 42.

The flow module 44, in response to obtaining the layer 3 address fields IP source address, IP destination address, TCP/UDP source port, and TCP/UDP destination port, generates for each of the layer 3 address fields a hash key using a prescribed hashing operation, e.g., a prescribed hash polynomial. The flow module 44 then combines the four hash keys to form a packet signature. The packet signature is then compared with precomputed signatures for the layer 3 switching entries in the policy table 28b.

The signature table 46 serves as an index between the flow module 44 and the policy table 28b to improve the search speed by the flow module 44. In particular, the signature table 46 within the network switch 12 stores the addresses of the layer 3 switching entries within the policy table 28b, and a corresponding entry signature. The entry signature represents a combination of hash keys that are generated based on the corresponding layer 3 information (IP source address, IP destination address, TCP/UDP source port, TCP/UDP destination port, and/or protocol number) in the layer 3 switching entries, using the same hashing algorithm (i.e., the same hash polynomials) that is used by the flow module 44 in generating the packet signature. Hence, the packet signature is used to search the signature table 46 for a matching entry signature. Once a matching entry signature has been found, the flow module 44 accesses the policy table 28b using the corresponding address to obtain the layer 3 switching entry. The flow module 44 then verifies that the accessed layer 3 switching entry matches the received data packet, and upon detecting a match supplies the identification information to the switching fabric 25 for execution of the corresponding layer 3 switching decision.

Figure 3:
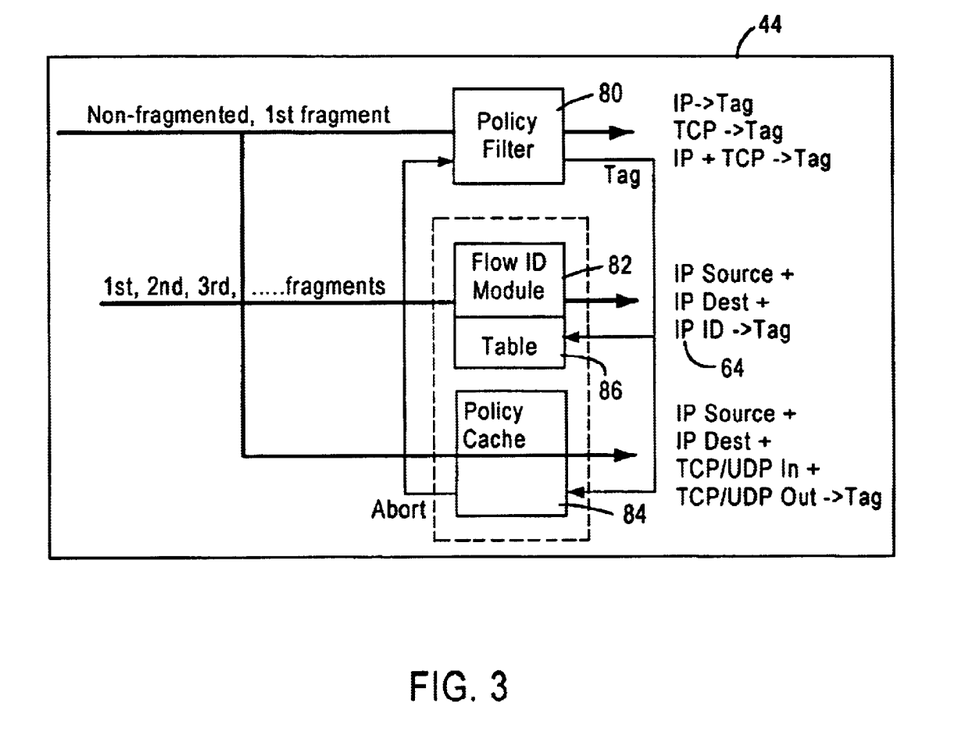
FIG. 3 is a block diagram illustrating in further detail the flow identification module of FIG. 2 according to an embodiment of the present invention.

FIG. 3 is a diagram illustrating in detail the flow module 44 of FIG. 2 according to an embodiment of the present invention. As shown in FIG. 3, the flow module 44 includes a policy filter 80, a flow identification module 82, and a policy cache 84. The policy filter 80 is configured for determining a policy identifier that specifies a layer 3 switching operation to be performed on a corresponding layer 2 frame for all non-fragmented packets and the first fragment of a fragmented flow. In particular, the policy filter 80 obtains the layer 3 information 114 (such as IP source address 122, IP destination address 124), and layer 4 information 116 (such as TCP/UDP source port 126 or TCP/UDP destination port 128) from a nonfragmented IP packet or the first IP fragment in a layer 2 packet 110. The policy filter 80 generates a packet signature and the flow module 44 simultaneously searches the signature table 46 and the policy cache 84, described below, in an effort to locate a match for the packet signature. The policy cache 84 is configured for storing packet signatures and respective policy identifiers for prior data packets having been classified earlier with respect to the corresponding policy identifier. Hence, the policy cache 84 can be used by the flow module 44 to reuse the previous search results generated by the policy filter 80. If the policy cache 84 does not have the needed entry, the policy filter 80 accesses the policy table 28b and stores the policy identifier (e.g., the packet signature) and the corresponding policy identifier into the policy cache 84 for local use.

The flow identification module 82, used to identify the policy identifier for an IP frame fragment, stores the IP source address, IP destination address, the IP identifier 64, and the corresponding policy identifier into an internal table 86 at the same time that the data is written into the policy cache 84. The flow identification module 82 uses the combination of the IP source address and the IP identifier to uniquely identify each of the data fragments as belonging to the same IP datagram for a given layer 4 data flow. Hence, the flow identification module 82 can select the policy identifier for each of the subsequent layer 3 frame fragments based on a match between the IP source address and IP identifier stored in the table 86 and the IP source address and the IP identifier in each of the layer 3 frame fragments.

Figure 4:
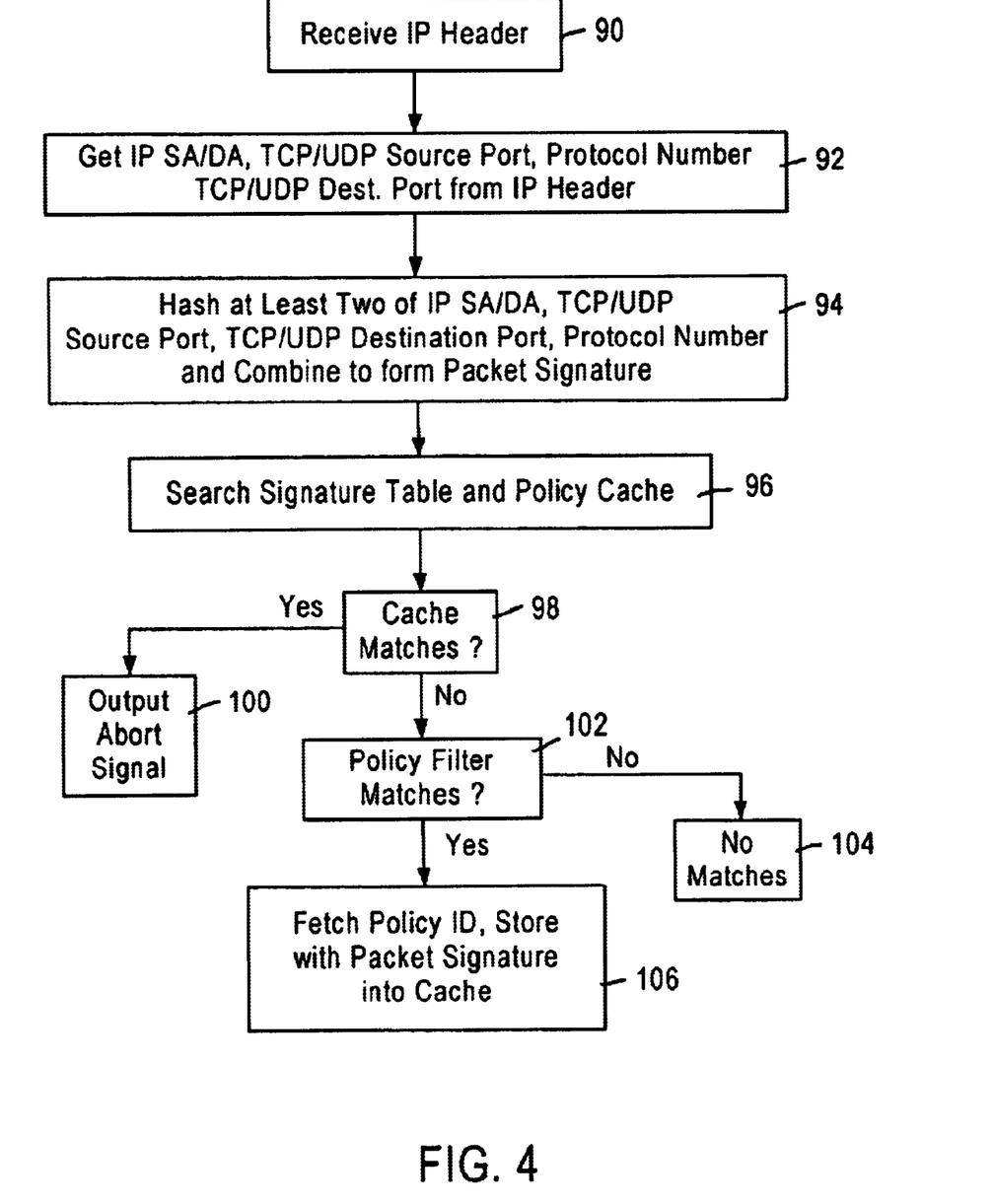
FIG. 4 is a flow diagram illustrating the method of selecting a policy identifier using simultaneous search operations according to an embodiment of the present invention.

FIG. 4 is a diagram illustrating the method by each switch port 20 in searching for a selected layer 3 switching entry and identifying a layer 3 switching decision according to an embodiment of the present invention. The port filter 40 and the flow module 44 receive the IP header of an incoming data packet in step 90. The frame identifier 42 identifies the beginning of the IP frame (and optionally extracts the layer 3 address information), enabling the flow module 44 to obtain the layer 3 address information including the IP source address, IP destination address, TCP/UDP source port, TCP/UDP destination port, and policy identifier in step 92.

The policy filter 80 then generates hash keys for each of the IP source address, IP destination address, TCP/UDP source port, TCP/UDP destination port, and policy identifier retrieved from the IP frame, and combines the hash keys together using an OR operation to generate the packet signature in step 94. Note that a packet signature and entry signature may be generated using as little as two hash keys, depending on the requirements of the network in performing layer 3 processing.

The flow module 44 then uses the generated packet signature to simultaneously search the signature table 46 and the local policy cache 84 in step 96. In particular, the policy filter 80 searches the signature table 46 using the packet signature and the local policy cache 84 simultaneously searches its internal table entries for the generated packet signature. If in step 98 the local policy cache 84 detects the generated packet signature within its internal table entries, the policy cache 84 outputs an abort signal in step 100 to the policy filter 80, causing the policy filter 80 to abort the current search. For example, the local policy cache 84 may have its own internal logic for performing the search operation using the generated packet signature. As apparent from the foregoing, the search of the policy cache 84 typically should be completed sooner than the searching of the signature table 46 by the policy filter 80.

If in step 98 the policy cache 84 does not detect the generated packet signature in its internal tables, the policy filter 80 continues searching of the switching table 46. If in step 102 the policy filter 80 does not detect any matches in the signature table 46, then the flow module 44 outputs a tag to the switching fabric 25 in step 104 indicating that there were no layer 3 matches.

However if in step 102 the policy filter 80 detects a match in the signature table of a packet signature, the policy filter 80 retrieves the corresponding policy identifier from the switching table 46, and stores the packet signature and the corresponding policy identifier in the policy cache 84 in step 106. The flow module 44 then verifies that one of the entries from the layer 3 switching entries matches the received data packet. In particular, the flow module 44 fetches the layer 3 information from the layer 3 address entries stored in the policy table 28*b* having the matched entry signatures. The flow module 44 then performs a bit-by-bit comparison of the selected layer 3 address fields of each accessed layer 3 switching entry and the layer 3 address fields of the received data packet. Hence, the flow module 44 identifies one of the layer 3 switching entries as a match with the received data packet based on the final bit-by-bit comparison of the layer 3 address information. The flow module 44 forwards the identified entry (e.g., by forwarding the address value) to the switching logic 25 enabling the layer 3 switching logic to execute the layer 3 switching decision that corresponds to the identified layer 3 switching entry matching the data packet.

According to the disclosed embodiment, a network switch 12 is able to efficiently search for layer 3 switching information for layer 3 frames by storing within a local policy cache a packet signature and a policy identifier that specifies a layer 3 switching operation to be performed based on layer 3 information and layer 4 information within the first layer 3 frame. Use of the local policy cache enables the network switch port to more quickly locate policy identifiers for data frames of an identified flow, improving performance by reducing the amount of resources necessary to locate the corresponding policy identifier. In addition, the size of the policy cache 84 can be controlled by using an aging function, which deletes the entry after a prescribed period of inactivity, for example five minutes. Hence, the search performance of the network switch port is improved, without substantially increasing the size of the integrated chip with large memory space.

Hence, the determination of the proper policy identifier for the layer 3 frame fragments by the network switch port provides distributed layer 3 processing within an integrated network switch, enabling the network switch to be implemented as a single select chip capable of operating at 100 Mb/s and gigabit network data rates without blocking within the network switch.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a network switch, the method comprising:
   receiving a first layer 2 frame at a network switch port, the first layer 2 frame including layer 3 information and layer 4 information that specify payload data characteristics within the first layer 2 frame;
   determining by a policy filter in the network switch port a policy identifier for the first layer 2 frame based on the layer 3 information and the layer 4 information, the policy identifier specifying a layer 3 switching operation to be performed on the first layer 2 frame;
   storing first information identifying the first layer 3 information and the layer 4 information, and the policy identifier, in a policy cache in the network switch port;
   receiving a second layer 2 frame at the network switch port; and
   simultaneously searching, for a second policy identifier for the second layer 2 frame, by the policy filter and within the policy cache.

2. The method of claim 1, wherein the simultaneously searching step includes supplying an abort signal to the policy filter in response to detecting the second policy identifier in the policy cache.

3. The method of claim 2, wherein the determining step includes generating the first information by generating hash keys for the layer 3 and layer 4 information, respectively, and combining the hash keys into a single signature.

4. The method of claim 3, wherein the determining step further includes searching a signature table within the network switch for the policy identifier using the single signature as a search key.

5. The method of claim 4, wherein the storing step includes storing the single signature and the corresponding policy identifier into the policy cache.

6. The method of claim 4, wherein the generating step includes generating the hash keys for each of an Internet Protocol (IP) source address, IP destination address, Transmission Control Protocol/User Datagram Protocol (TCP/UDP) source port, TCP/UDP destination port, and a protocol number.

7. The method of claim 1, wherein the determining step includes generating the first information by generating hash keys for the layer 3 and layer 4 information, respectively, and combining the hash keys into a single signature.

8. The method of claim 7, wherein the storing step includes storing the single signature and the corresponding policy identifier into the policy cache.

9. The method of claim 8, wherein the determining step further includes searching a signature table within the network switch for the policy identifier using the single signature as a search key.

10. The method of claim 9, wherein the generating step includes generating the hash keys for at least two of an Internet Protocol (IP) source address, IP destination address, Transmission Control Protocol/User Datagram Protocol (TCP/UDP) source port, TCP/UDP destination port, and a protocol number.

11. The method of claim 10, wherein the generating step includes generating the hash keys for each of the IP source address, IP destination address, TCP/UDP source port, TCP/UDP destination port, and the protocol number.

12. The method of claim 11, wherein the simultaneously searching step includes generating the single signature for the second layer 2 frame, and simultaneously searching the signature table by the policy filter and the policy cache for the second policy identifier using the single signature for the second layer 2 frame.

13. An integrated network switch configured for executing layer 3 switching decisions, the integrated network switch comprising:

an index table that includes addresses of layer 3 switching entries that specify respective layer 3 switching operations based on selected data fields within a received data packet, the index table also including for each address entry a corresponding entry signature representing a combination of the selected data fields hashed according to a prescribed hashing operation; and network switch ports each comprising:
(1) a policy filter configured for obtaining layer 3 information and layer 4 information, corresponding to the selected data fields, from a received layer 2 frame and determining, based on generation of a second entry signature from the obtained layer 3 information and layer 4 information, a policy identifier that specifies the layer 3 switching operation to be performed on the corresponding layer 2 frame, and
(2) a policy cache configured for storing the policy identifier having been determined by the policy filter and the corresponding entry signature, the network switch port simultaneously searching using the policy filter and the policy cache for determining the policy identifier for each corresponding subsequently received layer 2 frame.

14. The switch of claim 13, wherein the policy filter generates the second entry signature by combining hash keys for at least two of an Internet Protocol (IP) source address, IP destination address, Transmission Control Protocol/User Datagram Protocol (TCP/UDP) source port, TCP/UDP destination port, and a protocol number.

15. The switch of claim 13, wherein the policy filter aborts searching of the index table in response to an abort signal indicating detection of the policy identifier for a corresponding received layer 2 frame in the policy cache.

* * * * *